UNITED STATES PATENT OFFICE.

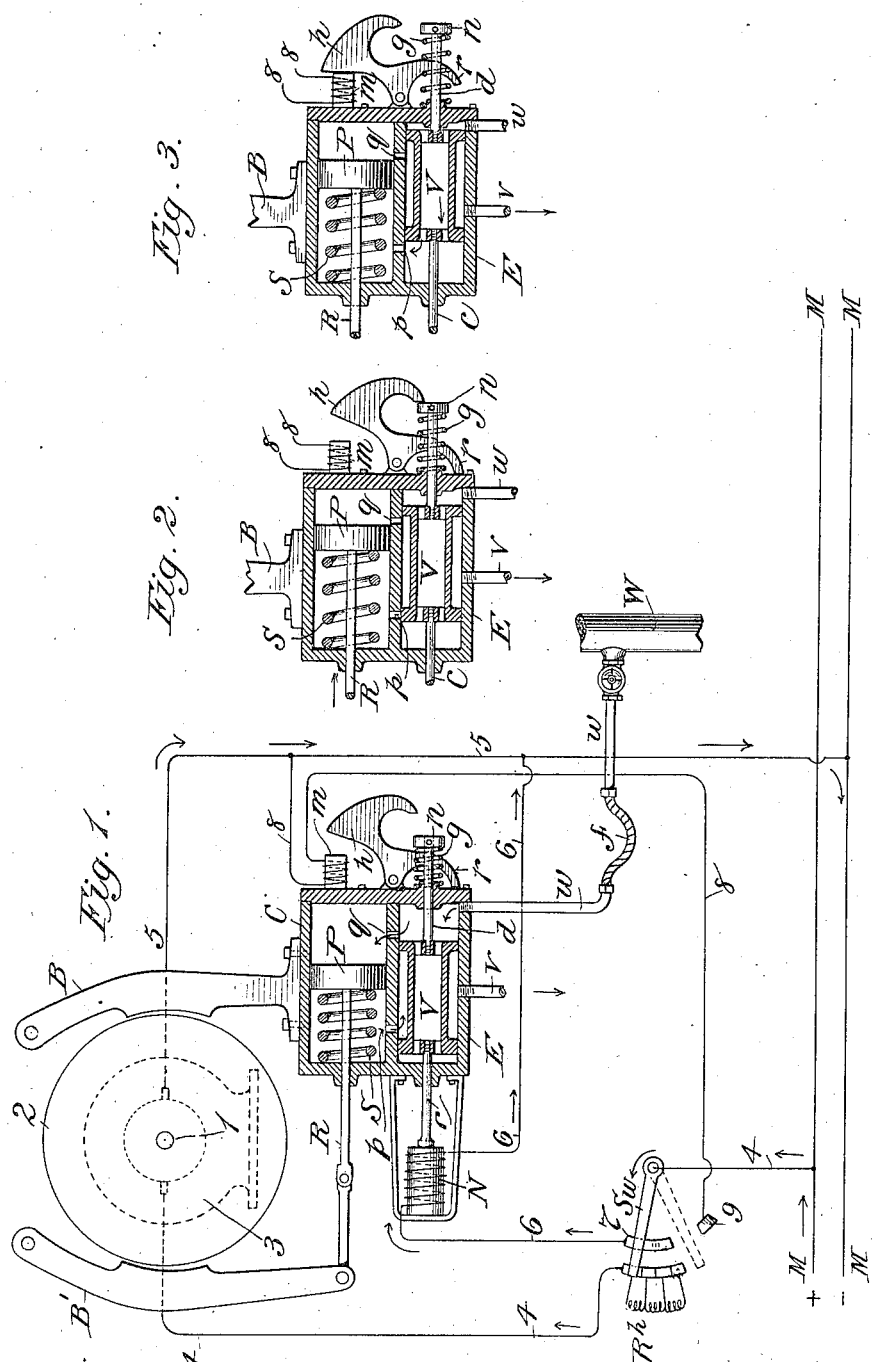

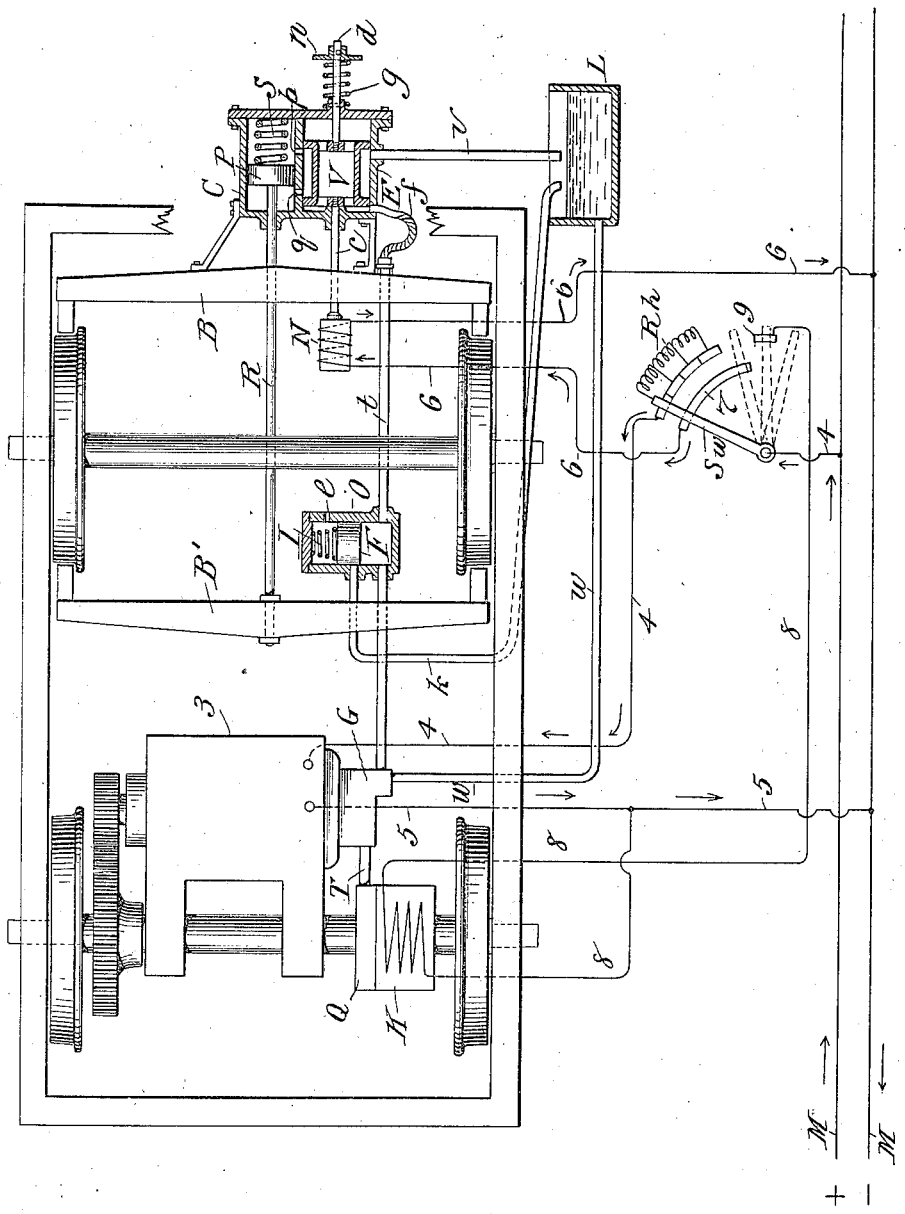

GUSTAF RENNERFELT, OF NEW YORK, N. Y., ASSIGNOR OF ONE-HALF TO CHARLES J. KINTNER, OF NEW YORK, N. Y.

BRAKE SYSTEM FOR MOVING VEHICLES.

1,194,783.  Specification of Letters Patent.  Patented Aug. 15, 1916.

Application filed July 16, 1909, Serial No. 507,895. Renewed March 19, 1915. Serial No. 15,577.

*To all whom it may concern:*

Be it known that I, GUSTAF RENNERFELT, a subject of the King of Sweden, and resident of New York, borough of Manhattan, county and State of New York, have made a new and useful Invention in Brake Systems for Moving Vehicles, of which the following is a specification.

My invention relates particularly to an improvement in brake systems operated or controlled through the medium of a mobile agent, such as liquids or gases under pressure, and it has for its objects, First, to provide a system of control of such a nature which may be utilized in the application of brakes either in connection with moving vehicles of the elevator or lift type; or, with wheeled vehicles generally, such as railway cars, auto cars, etc. Second, to provide a system of control in which the application of pressure of the mobile agent is made dependent upon the movement of the vehicle itself and of the source of power which drives it. Third, to provide a system of control of the nature referred to which is adapted for use with electrically propelled vehicles and is so constructed and arranged that the operating arm of the controller which regulates the flow of the working current and the application thereof to the motor or motors is also utilized in the application of the brakes after the current to the motor or motors has been cut off. Fourth, to provide such a system of control when used with electrically propelled vehicles with additional means for applying an emergency brake, which additional means is operatively connected with the arm of the controller. Fifth, to provide railway cars or like moving vehicles with a hydraulic system of control for the brakes thereof, in which the liquid utilized is maintained under pressure through the agency of compressing means carried by the car, and operated by the motor driving the same or connected to and driven by one of the driven axles of the car. Sixth, to provide such a system of control in which the hydraulic mobile agent is preferably a light lubricating oil which is kept circulating through a compression or storage chamber, the brake controlling mechanism and a supply chamber.

My invention will be fully understood by referring to the accompanying drawings; in which, Figure 1 illustrates diagrammatically the application thereof to an electrically propelled elevator car, the rotary shaft, the brake-wheel and the brake-arms being shown in elevational view; the controlling appliance proper being shown partly in sectional and partly in side elevational view. Fig. 2 is a sectional view of the controlling appliance, showing the action thereof when the brakes are applied and. Fig. 3 is a view similar to Fig. 2 showing the action thereof when the emergency appliance is actuated. Fig. 4 is a view illustrating the application of my invention to an electrically propelled tram-car, the electrical circuits being shown in diagrammatic view, the truck of the car, the driving motor therefor, and part of the appliance in plan view and the controlling apparatus in sectional view.

Referring now to the drawings in detail, for a full and clear understanding of the invention, such as will enable others skilled in the art to construct and use the same, and first to Figs. 1 to 3 inclusive, 1 represents the rotary shaft which supports the driving drum for an electrically propelled elevator car, not shown; 2 represents the brake-wheel upon the same shaft and 3 illustrates in dotted lines an electric motor for driving the same, the armature thereof being connected to the shaft in the usual way. 4 and 5 represent conductors or feed circuits running directly from the commutator brushes of the motor to the current mains $+M$ and $-M$ from which the propelling current is derived. 6 represents a branch circuit running from a contact 7 to and through a brake controlling solenoid N, said circuit being connected on one side to the main $-M$ and on the other side through the arm of the controller or switch S$w$, R$h$ illustrating diagrammatically a well known means of varying current flow to the motor, it being understood that any of the well known forms of controllers for supplying current to the motor or motors may be used. 8 is a branch circuit running from a contact arm 9 under the arm of the controller or switch S$w$ to and through an emergency electromagnet $m$ and to the feed circuit 5. C represents a brake controlling cylinder and P the piston thereof operatively connected through a rod or link R with one end of a pivoted brake-arm B¹, another pivoted brake-arm B being secured directly to and movable with the cylinder C. S represents a strong spiral spring constituting a constantly acting source of energy for applying the brake shoes of the brake arms B and B¹ to the brake-wheel 2 when the pressure behind the piston P is released. E represents the valve chamber of the brake controlling cylinder, the same being preferably cast integral therewith and V a hollow cylindrical control valve having enlarged heads adapted to open and close the ports $p$ and $q$. $c$ represents a valve stem connected at its end to one end of the valve V and at the other end to the core of the solenoid N. $d$ represents an additional valve stem connected to the other end of the valve V and provided with a head $n$ at its outer end and a spring $g$ for moving it longitudinally when the solenoid N is demagnetized. W represents a water or other liquid main connected with a source of water, air, gas, or liquid mobile agent under pressure, the same being connected through a branch pipe or tube $w$ and an intermediate flexible tube $f$ with the interior of the valve chamber E. The arrangement of these parts is such that the controlling cylinder C operatively connected with the brake-arm B will move in one direction when the other brake-arm B¹ is moved in a reverse direction. $v$ is a vent or exhaust pipe operatively connected with the interior of the valve chamber E, its function being to carry away the released liquid from time to time as the apparatus operates. $h$ represents a latch made preferably of magnetic material and pivoted, as shown, to the head of the cylinder C and valve chamber E with its upper end located in the magnetic field of the magnet $m$, said latch being of such weight that normally it is held by the action of gravity in the position shown in Figs. 1 and 2 with the stop-arm $r$ at its lower end resting against the head of the cylinder and with the hooked end thereof located in the path of the head $n$ of the valve stem $d$. The function of this latch is to limit the movement of the valve V, as shown in Fig. 2, unless the emergency appliance be actuated as shown in Fig. 3.

I will now describe the mode of operation of this application of the invention. Suppose the current be flowing from some source of electrical energy, not shown, through the main +M, by way of the feed circuit 4 in the direction of the arrows, the arm of the controller or switch Sw to and through the motor 3, feed circuit 5 to the main —M. This causes the car to move in the usual way, it being understood that a liquid or other mobile agent under pressure enters from the main W, hand-control cock, branch pipe or tube $w$, flexible tube $f$ to the inner surface of the valve chamber E; thence by way of the port $q$ into the cylinder C, thus acting by compression to advance the piston P so as to store up energy in the spring S; at the same time, causing the brake-arms B and B¹ to move about their pivoted supports so as to prevent any braking action by the shoes thereof upon the brake-wheel 2. The car, therefore, continues to move until the operator throws the controller arm or switch Sw into the position shown in dotted lines, decreasing the speed in the usual way while being thus thrown and at the same time breaking the circuit to and through the motor 3 and to and through the solenoid N. This permits the spring $g$, acting behind the head $n$ and through the valve stem $d$, to move the valve V into the position shown in Fig. 2 of the drawings, with the head $n$ resting against the hooked portion of the latch $h$, so that the port $p$ is closed and the port $q$ left open in communication with the waste pipe $v$. Consequently, the two brake-arms B and B¹, acting under stored-up energy in the spring S, are caused to exert the usual gripping action of the brake-shoes upon the brake-wheel 2; at the same time, the liquid in the cylinder C is released and allowed to pass outward through the port $q$ and around the outer surface of the valve V, ultimately finding its way into the sewer; or, if an oil be used, into a reservoir from which it may again be withdrawn for use. In the event of the car having too great velocity to stop at the proper level, the attendant may apply an emergency brake by throwing the arm of the controller or switch Sw upon the contact arm 9, thereby closing the branch circuit 8 through the emergency magnet $m$, so that the magnetizable part of the latch $h$ is energized and said latch is moved into the position shown in Fig. 3, under which condition the spring $g$ acting against the head $n$ advances the valve V to its extreme position, under which condition the port $p$ has been opened, so that liquid is now admitted through the pipe or tube $w$ and acts conjointly with the stored up energy in the spring S to more forcibly apply the brake-arms B, B¹ upon the brake-wheel 2, the port $q$ acting in this instance as a vent for escaping liquid. When the arm of the controller or switch Sw is moved so as to again connect with the current regulating means R$h$ and contact 7, the motor is again started and the solenoid N is caused to restore the valve to its original position shown in Fig. 1, and the brake-arms B, B¹ are returned under the action of the liquid in the chamber C to their normal positions, the spring S being put under compression as disclosed in Fig. 1. The latch $h$ is simultaneously released when the switch Sw leaves the contact 9.

In Fig. 4 of the drawings I have illustrated the application of my invention to an electrically propelled tram-car this form of the invention disclosing a truck frame together with four tram-wheels operatively connected through the usual train of gear to an electric motor 3 which is in turn electrically connected through its commutator brushes directly with the mains +M and —M by the arm of the controller or switch Sw. The brake-arms B and B¹ in this application of the invention are held apart through the agency of a rigid rod R and the spiral spring or other source of stored up energy S. K represents a magnetically controlled clutch carried by one of the axles and adapted to be operatively connected with a loose eccentric Q journaled on the same axle and connected in turn through a piston T with a pump G, which pump is connected in turn with a pipe or tube w running to a supply tank L containing a liquid preferably a light lubricating oil. t is a pipe running from the pump directly to a storage chamber o and from thence to and through a flexible tube f where it is connected directly to the valve chamber E, V being the control valve as before and N the control solenoid. F is a compression piston in the storage chamber o, I being a compression spring adapted to act directly upon the compression piston and subject the liquid to sufficient pressure to operate or control the brakes, as will be described later on. e is a vent located above the compression piston F. k is a waste pipe connected at one end directly to the storage chamber o and at such point as will permit the liquid or mobile agent under pressure to flow therefrom into the supply chamber L after the liquid has been subjected to sufficient pressure, such pipe acting as a safety vent adapted to prevent any rupture of either the compression chamber or of the pipes t and f. The circuit relations between the controller, the mains, the motor and the controlling cylinder are substantially like those disclosed in Fig. 1 and the operation of this application of the invention is as follows:—Suppose the car to be running under full speed and the arm of the controller Sw in position, as shown. Current is, therefore, being supplied to the motor 3, as will be apparent on tracing the circuits and also to the solenoid N, thereby holding the valve V in its extreme left-hand position with the spring g under compression; consequently, no liquid is entering, or can enter the cylinder C, although the liquid under pressure in the chamber o forces the same into the valve chamber E. On cutting off the current to the motor and ultimately interrupting the circuit between the arm of the controller Sw and contact 7, the solenoid N is demagnetized and the spring g permitted to act upon the valve stem d in such manner as to move the valve V to the right, thereby admitting liquid under pressure through the port p against the piston P, thus applying the brakes by the direct application of hydraulic pressure against the action of spring S and causing the two brake-arms B and B¹ to advance in opposite directions, so that the shoes of said brake-arms are forced against the faces of the tram-wheels, thus tending to bring the car to a stop. Should there be sufficient pressure in the storing chamber o to apply the brakes with sufficient force the motorman moves the arm of the controller or switch Sw into electrical contact with the contact point 9, thus closing the circuit to the clutch K and causing the eccentric Q on the car-axle to actuate the pump G, thereby drawing oil from the tank L through the pipe w and forcing it into the storage chamber o while the car is coasting. The pump G as before stated may be directly connected with the armature of the motor 3 and driven continuously during propulsion, if preferred, but I prefer to have the same actuated through the agency of clutching mechanism, thereby utilizing it only when actually needed.

I do not limit my invention to the specific details of construction shown in the drawings and hereinbefore described, as obviously a number of the features thereof may be departed from and still come within the scope of my claims hereinafter made. I believe it is broadly new with me to utilize a constantly acting source of energy for applying the brakes to wheeled vehicles and to oppose said constantly acting source of energy with a mobile agent under pressure, or vice versa, the application of such force being effected alternately by or through the agency of an electrically controlled appliance moving with or controlled by the manually controlled appliances which supply or control the source of energy that propels the vehicle, and my claims are generic as to this feature. Nor do I limit myself to the use of a liquid mobile agent as obviously air or any well known gas may be used for the purpose and in the manner specified.

Having thus described my invention what I claim and desire to secure by Letters Patent of the United States is—

1. A moving vehicle; a brake system therefor; a source of applied energy operatively connected with and acting on the brakes; a liquid under pressure and means for causing the liquid to oppose the applied energy; in combination with a source of electrical energy for the vehicle, and a motor therefor; means for regulating the application of electric power thereto; together with means comprising a circuit controlled by said regulating means for effecting the operation of the brakes when the power is cut off from the motor.

2. A vehicle; an electric motor and a source of electric power therefor; a brake system for the vehicle; a source of applied energy operatively connected with the brakes thereof, and a liquid under pressure operatively connected to the brakes and opposing the applied source of energy; an electric controller for applying power to the motor and means for controlling the application of the liquid to the brakes; together with connections comprising a circuit between the controller and the brake controlling means whereby on disconnecting the motor from its source of energy the brakes are automatically applied.

3. A vehicle; a source of electrical energy; an electric motor for propelling the vehicle; a controller for regulating the application of current from the source of electrical energy through the motor; a brake system and electrically and hydraulically controlled means for regulating the application thereof to the vehicle; circuits and circuit connections between the brake control mechanism and the aforesaid controller whereby when the motor is disconnected from the circuit the brakes are applied.

4. A brake system for power impelled vehicles, embracing mechanical and hydraulical sources of energy adapted to oppose each other and both operatively connected with the brakes; in combination with a source of electric power for moving the vehicle, and an electric controller therefor, said controller being operatively connected with means comprising a circuit for regulating the application of one of the brake controlling sources of energy to the brakes, and for cutting out the motor when said brakes are applied.

5. A brake system for power impelled vehicles, embracing mechanical and hydraulical sources of energy adapted to oppose each other and both operatively connected with the brakes; in combination with a source of power for moving the vehicle, and a controller therefor, said controller being operatively connected with means for regulating the application of one of the brake controlling sources of energy to the brakes; together with additional means operatively connected with the controller for bringing about an emergency braking effect.

6. An electrically propelled vehicle provided with a brake system embodying mechanical and hydraulical sources of energy, one of which tends to hold the brakes normally out of action; in combination with a controller for regulating the application of a power impelling current; together with means operatively connected with the same controller and with the brake controlling means, the arrangement being such that when the power impelling current is broken at the controller it is also broken for the brake controlling appliances at the same controller.

In testimony whereof I have signed my name to this specification in the presence of two subscribing witnesses.

GUSTAF RENNERFELT.

Witnesses:
  C. J. KINTNER,
  M. F. KEATING.